Patented Dec. 3, 1929

1,738,193

UNITED STATES PATENT OFFICE

RALPH H. McKEE, OF JERSEY CITY, NEW JERSEY, AND STEPHEN P. BURKE, OF NEW YORK, N. Y.

METHOD OF MAKING ALKYL HALIDES

No Drawing.   Application filed August 8, 1927. Serial No. 211,625.

This invention relates to a process of making alkyl halides such for example as methyl chlorid, in the gas phase and in the presence of a catalyst.

The process comprises reacting an alcohol corresponding to the alkyl halide which it is desired to produce, with a hydrogen halide in the gas phase in the presence of a catalyst such as a magnesium halide.

It has long been known that alkyl halides, such as methyl chlorid, can be made by treating methyl alcohol with hydrogen chlorid, the reaction taking place in the liquid phase. Attempts to carry out the reaction in the gaseous phase have however been unsuccessful. In this connection, reference is made to an article by Carter and Megson on "The action of hydrogen chlorid on alcohol" appearing in the January 28, 1927 issue of the Journal of the Society of Chemical Industry, where these authors show that the reaction between these materials does not take place in the gaseous phase. Theoretically the admixture of an alcohol with a hydrogen halide in the gas phase should produce a good yield of alkyl halide. However, such is not found to be the case in practice due to the fact that the reaction at temperatures of 300 to 350° C. is one which is very slow and needs a catalyst due to the chemical inhibition of the reaction. Attempts to speed up the reaction by higher temperatures, but without a catalyst, are useless due to the fact that thermal decomposition occurs on both the alkyl halide and the alcohol into decomposition products which are useless.

We have found that this chemical inhibition can be broken down by means of a catalyst, and that by the use of suitable catalytic agents, the reaction in the vapor phase, can be carried out at moderate temperatures to approximate completeness and under conditions which are very desirable from an industrial viewpoint.

We have found that in the presence of certain catalytic agents, particularly certain metal halides, the reaction will readily take place at approximately 300° C., whereas in the absence of the catalytic agent no substantial amount of the alkyl halide is formed. If we bring the mixed gases at a temperature of approximately 300° C. into contact with magnesium chlorid, reaction takes place with very much increased velocity. However, such oxids as silica or chlorids such as sodium chlorid, and certain other metal chlorids, are without substantial effect on the reaction between two gases such as methyl alcohol and hydrogen chlorid.

In place of the magnesium chlorid mentioned above cadmium chlorid, barium chlorid, or oxids, carbonates or other compounds which under the conditions of the reaction give these metallic chlorids, may be used. It will be noted that the catalysts which we have found to be advantageous for use in the practice of our invention are all solid compounds and are all salts of bivalent metals. As will be apparent to those skilled in the art these compounds are substantially non-hydrolyzable when dissolved in water and are substantially non-dehydrating in use in organic chemistry syntheses. Magnesium chlorid is the preferred catalyst both because it is cheap and readily prepared and because of the high speed it gives to the reaction.

If it is desired to make alkyl bromid, hydrogen bromid in the gas phase is used with the alcohol, likewise in gas phase, together preferably with magnesium bromid as a catalyst instead of the magnesium chlorid mentioned above. In the production of alkyl bromids, if magnesium chlorid were used instead of magnesium bromid, the resulting product would be diluted with a slight amount of alkyl chlorid which is undesirable.

In place of methyl alcohol, any of the higher alcohols—those of larger molecular weight—may be used to produce the corresponding alkyl halides. We also may employ combined and substituted alcohols and the treatment of such alcohols is contemplated as within the purview of our process.

In the preferred practice of my invention where it is desired to produce methyl chlorid, the mixed gases consisting of methyl alcohol and hydrogen chlorid are passed over granular magnesium chlorid. A carrier such as a porous silicious material which has been impregnated with magnesium chlorid by subjecting it to a solution of the magnesium chlorid and then dried may be advantageously employed in place of the granular magnesium chlorid. Approximately 200 cc. per minute of the mixed vapors may be passed through a tube of approximately one-half inch diameter which tube has been previously filled for about one foot with a granular carrier impregnated with magnesium chlorid, and may be transformed into the desired products to the extent of more than 80 per cent without the formation of appreciable amounts of undesirable by-products, due either to the decomposition of the starting materials or of the products of the reaction.

The resulting mixed gases consisting of methyl chlorid, steam and small amounts of methyl alcohol and hydrochloric acid can readily be separated by dissolving all but the methyl chlorid by cooling and passing the gases through a small volume of water. The methyl chlorid so produced is of a purity useful for most industrial purposes. If a methyl chlorid of extreme purity is desired, it can be further purified by methods well known in the art, but which form no part of the present invention.

Although the reaction may be carried out at atmospheric pressure, it is preferred to employ a pressure above atmospheric in order to decrease the size of the industrial apparatus used. A pressure of approximately 50 pounds per square inch has been found to be very satisfactory.

Although we have set forth the preferred practice of our invention, it is to be understood that various changes may be made in the choice and proportion of materials and details of procedure without departing from the spirit of our invention or the scope of the subjoined claims.

We claim:

1. The process of making an organic halide which comprises reacting the corresponding alcohol with a hydrogen halide in the gas phase in the presence of a catalyst favorable to said reaction, said catalyst comprising a substantially non-hydrolyzable solid salt of a bivalent metal.

2. The process of making an organic halide which comprises reacting the corresponding alcohol with a hydrogen halide in the gas phase, in the presence of a substantially non-hydrolyzable solid catalyst comprising a bivalent metal halide.

3. The process of making an organic halide which comprises reacting the corresponding alcohol with a hydrogen halide in the gas phase, in the presence of a catalyst comprising a magnesium halide.

4. The process of making an organic halide which comprises reacting the corresponding alcohol with a hydrogen halide in the gas phase at a temperature between 250° C. and 350° C. in the presence of a catalyst favorable to said reaction, said catalyst comprising a substantially non-hydrolyzable solid salt of a bivalent metal.

5. The process of making an organic halide which comprises reacting the corresponding alcohol with a hydrogen halide in the gas phase, at a temperature between 250° C. and 350° C. in the presence of a substantially non-hydrolyzable solid salt catalyst comprising a bivalent metal halide.

6. The process of making an organic halide which comprises reacting the corresponding alcohol with a hydrogen halide in the gas phase, at a temperature between 250° C. and 350 C. in the presence of a catalyst comprising a magnesium halide.

7. The process of making an organic halide which comprises reacting the corresponding alcohol with a hydrogen halide in the gas phase at approximately 300° C. in the presence of a catalyst favorable to said reaction, said catalyst comprising a substantially non-hydrolyzable solid salt of a bivalent metal.

8. The process of making an organic halide which comprises reacting the corresponding alcohol with a hydrogen halide in the gas phase, at approximately 300° C. in the presence of a substantially nonhydrolyzable solid catalyst comprising a bivalent metal halide.

9. The process of making an organic halide which comprises reacting the corresponding alcohol with a hydrogen halide in the gas phase, at approximately 300° C. in the presence of a catalyst comprising a magnesium halide.

10. The process of making methyl chlorid which comprises reacting methyl alcohol with hydrogen chlorid in the gas phase in the presence of a catalyst favorable to said reaction, said catalyst comprising a substantially non-hydrolyzable solid salt of a bivalent metal.

11. The process of making methyl chlorid which comprises reacting methyl alcohol with hydrogen chlorid in the gas phase, in the presence of a substantially nonhydrolyzable solid catalyst comprising a bivalent metal chlorid.

12. The process of making methyl chlorid which comprises reacting methyl alcohol with hydrogen chloride in the gas phase, in the presence of a catalyst comprising magnesium chlorid.

13. The process of making methyl chlorid which comprises reacting methyl alcohol with hydrogen chlorid in the gas phase at a temperature between 250° C. and 350° C. in the presence of a catalyst favorable to said reaction, said catalyst comprising a substantially non-hydrolyzable solid salt of a bivalent metal.

14. The process of making methyl chlorid which comprises reacting methyl alcohol with hydrogen chlorid in the gas phase at a temperature between 250° C. and 350° C. in the presence of a catalyst comprising magnesium chlorid.

15. The process of making methyl chlorid which comprises reacting methyl alcohol with hydrogen chlorid in the gas phase at approximately 300° C. in the presence of a catalyst favorable to said reaction, said catalyst comprising a substantially non-hydrolyzable solid salt of a bivalent metal.

16. The process of making methyl chlorid which comprises reacting methyl alcohol with hydrogen chlorid in the gas phase at approximately 300° C. in the presence of magnesium chlorid.

17. The process of making an organic halide which comprises contacting the corresponding alcohol and a hydrogen halide in the gas phase, with a bivalent metal compound which, by the resulting reaction, is changed into a metallic halide catalyst favorable to the reaction of said alcohol and said hydrogen halide.

18. The process of making an organic chlorid which comprises contacting the corresponding alcohol and hydrogen chlorid in the gas phase with a bivalent metal compound which, by reacting with hydrogen chlorid, is changed into a metal chlorid catalyst favorable to the reaction of said alcohol and said hydrogen chlorid.

19. The process of making an organic halide which comprises reacting the corresponding alcohol with a hydrogen halide in the gas phase under superatmospheric pressure, in the presence of a catalyst favorable to said reaction, said catalyst comprising a substantially non-hydrolyzable solid salt of a bivalent metal.

20. The process of making an organic halide which comprises reacting the corresponding alcohol with a hydrogen halide in the gas phase in the presence of a catalyst favorable to said reaction, said catalyst comprising a substantially non-hydrolyzable solid salt of a bivalent metal, and purifying the resulting organic halide by washing with water.

In testimony whereof we affix our signatures.

RALPH H. McKEE.
STEPHEN P. BURKE.